(12) United States Patent
Yoneyama

(10) Patent No.: US 11,426,872 B2
(45) Date of Patent: Aug. 30, 2022

(54) ROBOT SYSTEM

(71) Applicant: FANUC CORPORATION, Yamanashi (JP)

(72) Inventor: Hiroyuki Yoneyama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 180 days.

(21) Appl. No.: 17/065,880

(22) Filed: Oct. 8, 2020

(65) Prior Publication Data

US 2021/0122042 A1    Apr. 29, 2021

(30) Foreign Application Priority Data

Oct. 29, 2019    (JP) .............................. JP2019-196088

(51) Int. Cl.
| | |
|---|---|
| B25J 13/06 | (2006.01) |
| B25J 9/16 | (2006.01) |
| G01B 11/25 | (2006.01) |
| B25J 13/08 | (2006.01) |
| B25J 9/00 | (2006.01) |

(52) U.S. Cl.
CPC ........... B25J 9/1664 (2013.01); B25J 9/0081 (2013.01); B25J 13/089 (2013.01); G01B 11/2513 (2013.01)

(58) Field of Classification Search
CPC ........ B25J 9/1664; B25J 9/0081; B25J 9/163; B25J 13/089; G01B 11/2513

USPC .................. 700/245, 257, 250; 345/419, 633
See application file for complete search history.

(56) References Cited

U.S. PATENT DOCUMENTS

| | | | |
|---|---|---|---|
| 2014/0249675 A1* | 9/2014 | Krishnasamy | .... H01L 21/67766 700/250 |
| 2018/0126720 A1* | 5/2018 | Tyler | ..................... B29C 70/384 |
| 2019/0049937 A1* | 2/2019 | Tetiker | ............... H01L 21/3065 |
| 2019/0243371 A1* | 8/2019 | Nister | .................. G05D 1/0242 |
| 2019/0336220 A1* | 11/2019 | Hladio | ................... A61B 34/10 |
| 2020/0104726 A1* | 4/2020 | Alvelda, VII | ........... G06N 5/04 |

FOREIGN PATENT DOCUMENTS

JP    2012-061529 A    3/2012

* cited by examiner

*Primary Examiner* — Dalena Tran
(74) *Attorney, Agent, or Firm* — Studebaker & Brackett PC

(57) ABSTRACT

To provide a robot system equipped with an off-line programming device which can create a machining path consisting of a trajectory of any shape, and can reduce the workload required in teaching of the machining path of any shape. Provided is an off-line programming device which teaches a program of a robot equipped with a toll that machines a workpiece arranged within a work space, the off-line programming device including a trajectory information creation unit which creates trajectory information of any 3D shape consisting of at least one layer; and a trajectory information editing unit which edits line segments constituting the trajectory information of the any 3D shape consisting of at least one layer.

4 Claims, 14 Drawing Sheets

<EXAMPLE OF TEXT FILE (3D POINT DATA)>

| Layer | X | Y | Z |
|---|---|---|---|
| 1 | −37.593 | 121.357 | 0.000 |
| 1 | −37.116 | 121.208 | 0.000 |
| 1 | −36.638 | 121.059 | 0.000 |
| 1 | −36.161 | 120.91 | 0.000 |
| 1 | −35.684 | 120.761 | 0.000 |
| 1 | −35.207 | 120.612 | 0.000 |
| 1 | −34.729 | 120.463 | 0.000 |
| 1 | −34.252 | 120.313 | 0.000 |
| 1 | −33.775 | 120.164 | 0.000 |
| 1 | −33.298 | 120.015 | 0.000 |
| 1 | −32.82 | 119.866 | 0.000 |
| 1 | −32.343 | 119.717 | 0.000 |
| 1 | −31.866 | 119.568 | 0.000 |
| 1 | −31.389 | 119.419 | 0.000 |
| ... | ... | ... | ... |

→

TRAJECTORY INFORMATION

<EXAMPLE OF CAD DATA (3D CAD DATA)>

<TRAJECTORY CREATED BY DEDICATED DRAWING TOOL>

FIG. 7
FIRST LAYER
SECOND LAYER
THIRD LAYER
FIG. 8
<MANUALLY DRAW AND CHANGE TRAJECTORY
INFORMATION OF ANY SHAPE READ FROM TEXT FILE>
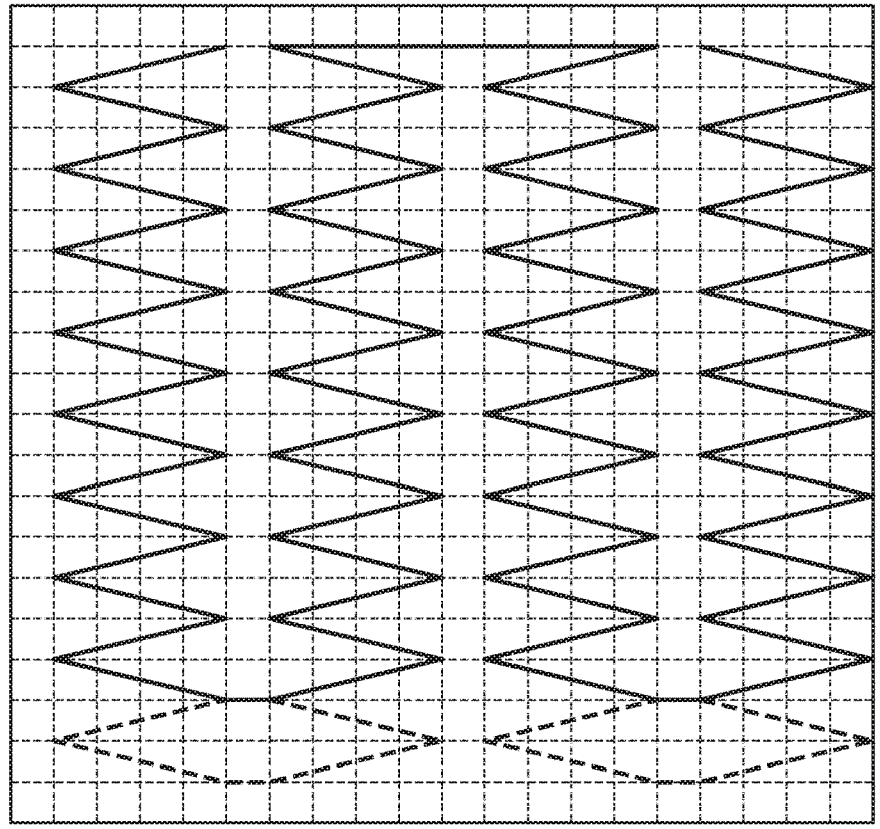

<NARROWLY DESIGNATE DEPTH IN Z DIRECTION>

FIRST LAYER

SECOND LAYER

THIRD LAYER

<WIDELY DESIGNATE DEPTH IN Z DIRECTION>

FIRST LAYER

SECOND LAYER

THIRD LAYER

<CHANGE SCALES OF X DIRECTION AND Y DIRECTION OF TRAJECTORY INFORMATION OF ANY SHAPE READ FROM TEXT FILE>

<SELECT ONE MOVEMENT PATTERN FROM PLURALITY OF TYPES OF MOVEMENT PATTERNS>

<SELECT THREE-DIMENSIONAL SHAPE INCLUDING CURVED SURFACE OR THREE-DIMENSIONAL SHAPE INCLUDING PLURALITY OF CONTINUOUS PLANES FORM THREE-DIMENSIONAL SHAPE STORAGE UNIT>

<FILLING WITH MOVEMENT PATTERN /
 ARRANGING THREE-DIMENSIONAL SHAPE IN VIRTURL SHAPE>

<SETTING POSITION AND POSTURE OF THREE-DIMENSIONAL SHAPE
 RELATIVE TO SURFACE OF WORK MODEL>

<CREATING MACHINING PATH OF TOOL>

<FILLING WITH MOVEMENT PATTERN /
ARRANGING THREE-DIMENSIONAL SHAPE IN VIRTURL SHAPE>

THREE-DIMENSIONAL SHAPE OF CURVED SURFACE FILLED BY MOVEMENT PATTERN

<SETTING POSITION AND POSTURE OF THREE-DIMENSIONAL SHAPE RELATIVE TO SURFACE OF WORK MODEL>

<CREATING MACHINING PATH OF TOOL>

<FILLING WITH MOVEMENT PATTERN /
ARRANGING THREE-DIMENSIONAL SHAPE IN VIRTURL SHAPE>

THREE-DIMENSIONAL SHAPE OF CURVED SURFACE FILLED BY MOVEMENT PATTERN

<SETTING POSITION AND POSTURE OF THREE-DIMENSIONAL SHAPE
RELATIVE TO SURFACE OF WORK MODEL>

<CREATING MACHINING PATH OF TOOL>

ROBOT SYSTEM

This application is based on and claims the benefit of priority from Japanese Patent Application No. 2019-196088, filed on 29 Oct. 2019, the content of which is incorporated herein by reference.

BACKGROUND OF THE INVENTION

Field of the Invention

The present invention relates to a robot system.

Related Art

Conventionally, there are robot systems configured so as to perform drive control of a robot equipped with a tool using an off-line programming device that teaches a program, and machines a workpiece arranged within a work space.

In this type of robot system (off-line programming device), a three-dimensional shape including a curved surface or a three-dimensional shape including a plurality of continuous planes is filled with a movement pattern consisting of a continuous trajectory indicating the periodic movement of the tool, the three-dimensional shape is arranged in a virtual space so that the movement pattern is projected onto at least one surface of a work model, and the machining path of the tool is created by projecting the movement path onto at least one surface of a work model. In addition, based on the created machining path and normal direction of at least one surface of the work model, it is configured so as to automatically determine the position or position and posture of the tool model.

For example, Patent Document 1 discloses "a device for generating a robot trajectory comprising a 3D space setting means for setting a pseudo-3D space; a 2D data reading means for reading 2D data; a 3D data generating means for generating 3D data by pasting the read 2D data on a specific surface in the above-mentioned pseudo 3D space; and a robot trajectory generating means for generating the trajectory of the tool of a robot based on the generated 3D data".

Patent Document 1: Japanese Unexamined Patent Application, Publication No. 2012-061529

SUMMARY OF THE INVENTION

However, in the above-mentioned conventional robot system, there has been a problem in that it is not possible to create a machining path consisting of a trajectory of any shape, due to selecting from among a plurality of types the movement patterns consisting of a continuous trajectory indicating the cyclic moment of the tool. There has been an inconvenience in that the teaching of the machining path of any shape must be taught manually, and thus taking a lot of work, and requiring great effort and time.

For this reason, the development of a technique has been strongly desired which can create a machining path consisting of the trajectory of any shape, and enables a decrease in the workload required in teaching of a machining path of any shape, and consequently, a drastic decrease in the effort and time required in the teaching of a machining path of any shape.

A robot system according to an aspect of the present disclosure includes an off-line programming device which teaches a program of a robot equipped with a tool that machines a workpiece disposed within a work space, in which the off-line programming device includes: a trajectory information creation unit which creates trajectory information of any three-dimensional shape consisting of at least one layer; and a trajectory information editing unit which edits the trajectory information of any three-dimensional shape consisting of at least one layer.

According to the aspect of the robot system of the present disclosure, it is possible to create a machining path consisting of the trajectory of any shape, and possible to reduce the workload required in teaching of the machining path of any shape. It thereby becomes possible to eliminate the conventional inconvenience of requiring great effort and time in the creation of a machining path consisting of the trajectory of any shape.

BRIEF DESCRIPTION OF THE DRAWINGS

FIG. 7 is a view showing an example of trajectory information of any 3D shape consisting of at least one layer;

FIG. 8 is a view showing an example of editing information of any 3D shape consisting of at least one layer;

DETAILED DESCRIPTION OF THE INVENTION

Hereinafter, a robot system according to an embodiment will be explained by referencing FIGS. 1 to 28.

The robot system of an embodiment of the present disclosure is a system for controlling the driving of a robot equipped with a tool using an off-line programming device that teaches a program, and machining a workpiece arranged within a work space.

Figure 1:
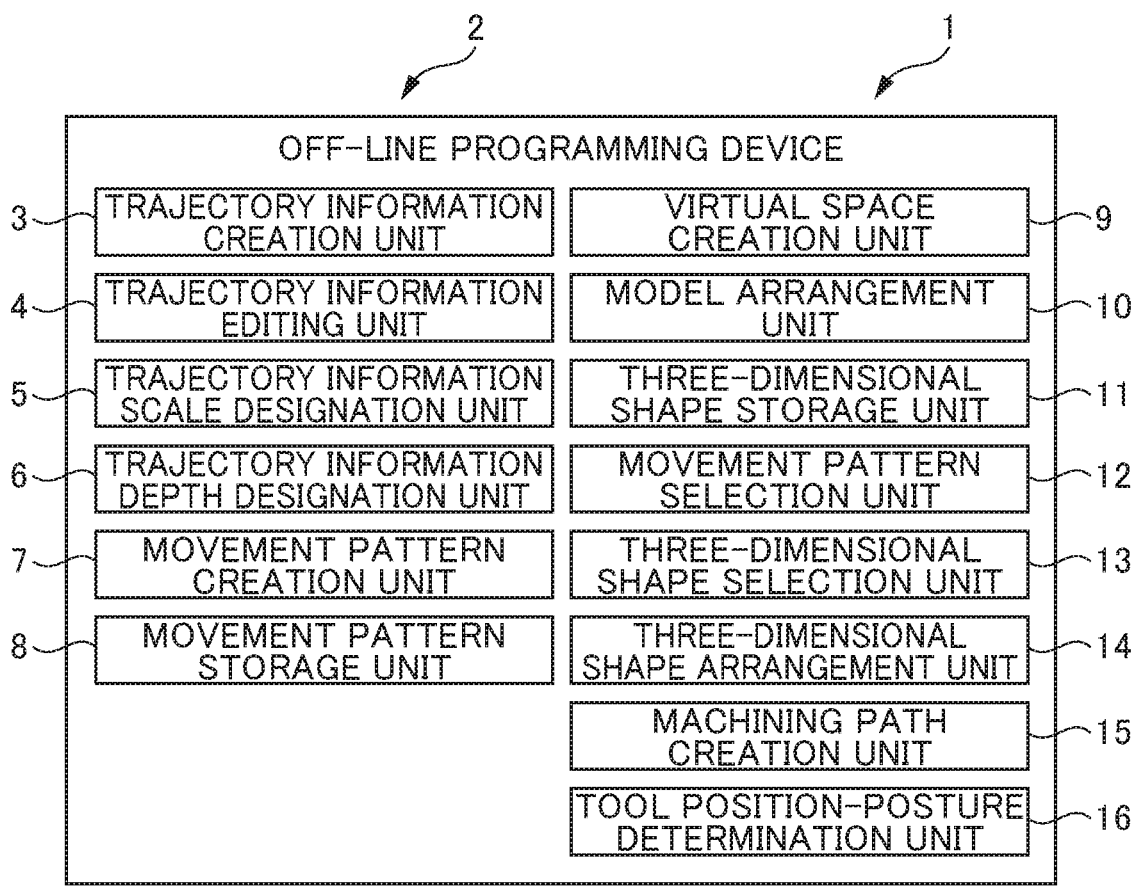
FIG. 1 is a view showing an off-line programming device of a robot system according to an embodiment.

More specifically, the robot system 1 of the present embodiment includes an off-line programming device 2 which teaches a program of a robot equipped with a tool that machines a workpiece arranged within a work space, as shown in FIG. 1.

The off-line programming device 2 includes: a trajectory information creation unit 3 which creates trajectory information of any 3D shape consisting of at least one layer; a trajectory information editing unit 4 which edits segments constituting the trajectory information of any 3D shape consisting of at least one layer; a trajectory information scale designation unit 5 which designates scales of the X direction which is one direction on the same plane as the trajectory information of any 3D shape consisting of at least one layer and a Y direction which is another direction orthogonal to the one direction; a trajectory information depth designation unit 6 which designates a depth in a Z direction orthogonal to the X direction and Y direction of the trajectory information of any 3D shape consisting of at least one layer; a movement pattern creation unit 7 which creates a movement pattern consisting of the trajectory of any 3D shape consisting of at least one layer; and a movement pattern storage unit 8 which stores a plurality of types of movement patterns consisting of the trajectory of any 3D shape consisting of at least one layer.

The off-line programming device 2 includes: a virtual space creation unit 9 which creates a virtual space representing a work space three-dimensionally; a model arrangement unit 10 which arranges a work model of the workpiece, a robot model of the robot and a tool model of the tool within virtual space created by the virtual space creation unit 9; a three-dimensional shape storage unit 11 which stores a three-dimensional shape including a curved surface and a three-dimensional shape including a plurality of continuous planes; a movement pattern selection unit 12 which selects one movement pattern from a plurality of types of movement patterns stored in the movement pattern storage unit 11; and a three-dimensional shape selection unit 13 which selects a three-dimensional shape including a curved surface or a three-dimensional shape including a plurality of continuous planes from the three-dimensional shape storage unit 11.

The off-line programming device 2 includes: a three-dimensional shape arrangement unit 14 which fills the curved surface or plurality of continuous planes of the three-dimensional shape selected by the three-dimensional shape selection unit 13 with the one movement pattern selected by the movement pattern selection unit, and arranges the three-dimensional shape in a virtual space so that the movement pattern is projected onto at least one surface of the work model; a machining path creation unit 15 which creates a machining path of the tool by projecting the movement pattern filling the curved surface or plurality of continuous planes of the three-dimensional shape onto at least one surface of the work model; and a tool position-posture determination unit 16 which automatically determines the position or position and posture of the tool model, based on the machining path created by the machining path creation unit 15 and the normal direction of at least one surface of the work model.

Figure 2:
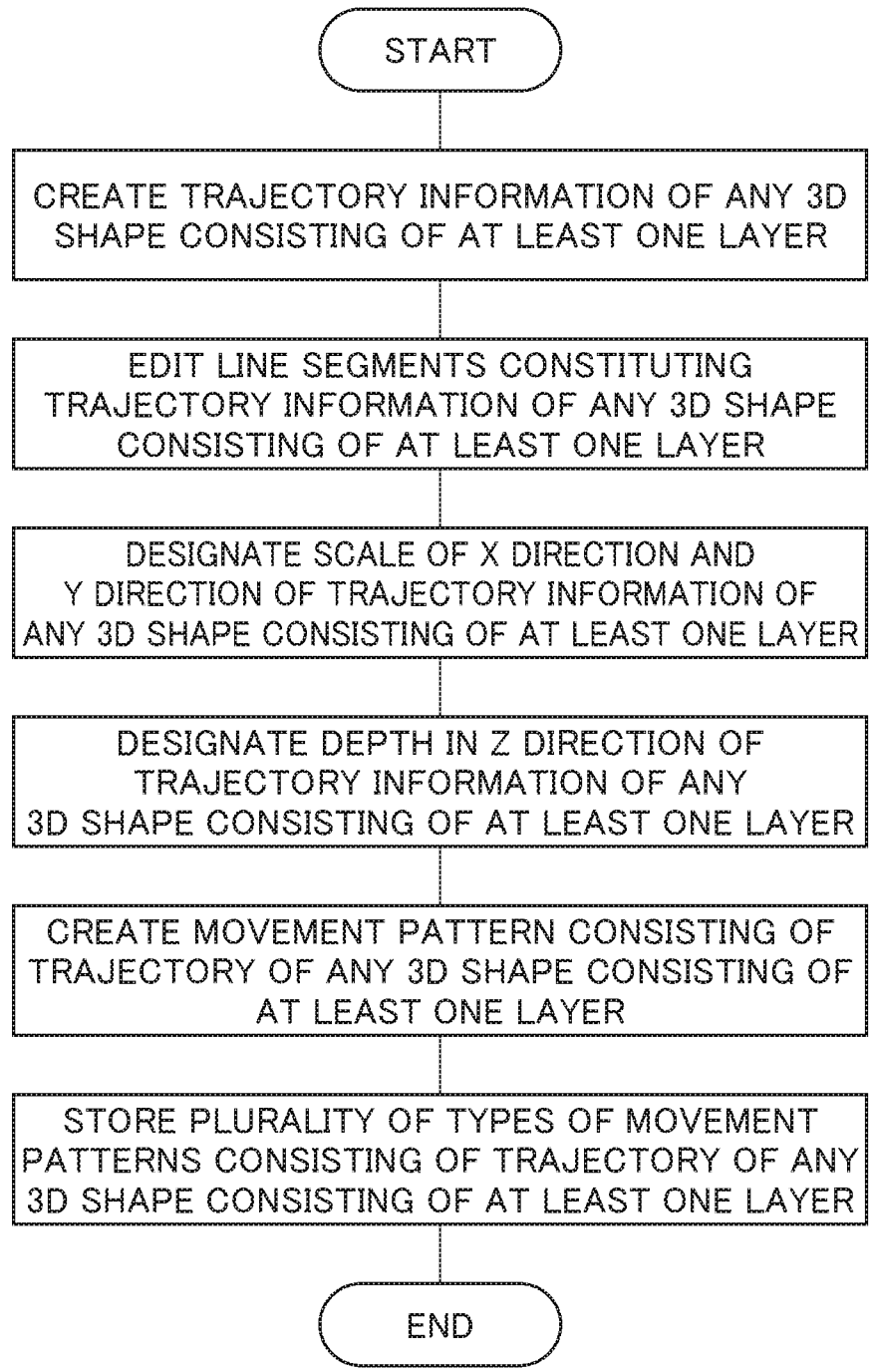
FIG. 2 is a flowchart showing a sequence of creating of a machining path of a tool using the off-line programming device of the robot system according to the embodiment, and determining a position or position and posture of a tool model.
Figure 3:
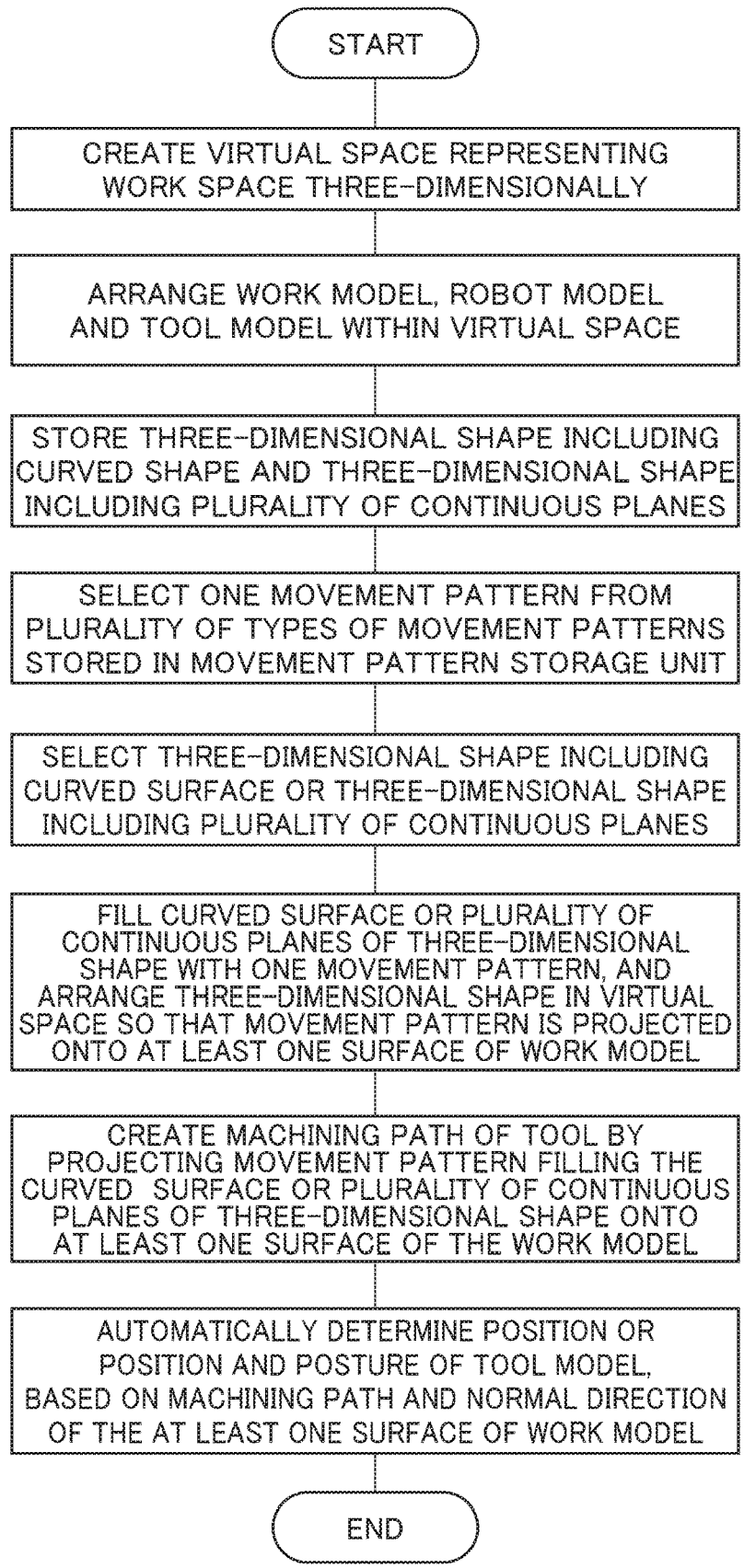
FIG. 3 is a flowchart showing a sequence of creating a machining route of the tool using the off-line programming device of the robot system according to the embodiment, and determining the position or position and posture of the tool model.
Figure 4:
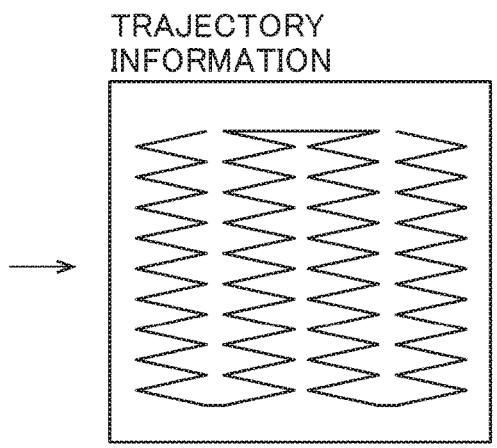
FIG. 4 is a view showing an example of trajectory information of any 3D shape consisting of at least one layer.

Then, the robot system 1 of the present embodiment consisting of the above configuration first creates trajectory information of any 3D shape consisting of at least one layer, as shown in FIGS. 2 and 4 (refer to FIG. 7).

For example, it reads a text file containing information of the trajectory of any 3D shape consisting of at least one layer, and creates trajectory information of any 3D shape consisting of at least one layer based on this.

At this time, it may be configured so as to read one text file containing information of the trajectory of any shape of all layers, or to read a plurality of text files containing information of the trajectory of any shape of each layer.

It may be configured so as to read CAD data containing information of the trajectory of any 3D shape consisting of at least one layer (refer to FIG. 5), or to create trajectory information of any 3D shape consisting of at least one layer. In this case, it may be configured so as to read one CAD data file containing information of the trajectory of any shape of all layers, and to read a plurality of CAD data files containing information of the trajectory of any shape of each layer.

Figure 6:
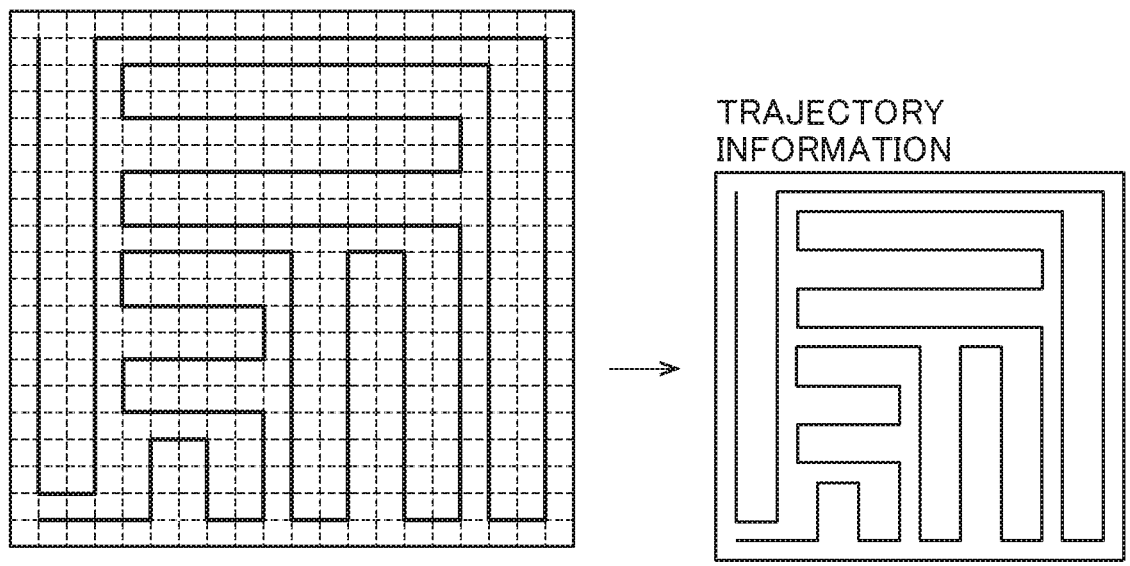
FIG. 6 is a view showing an example of trajectory information of any 3D shape consisting of at least one layer.

It may be configured so as to create trajectory information of any 3D shape consisting of at least one layer, by manually drawing and creating the trajectory of any 3D shape consisting of at least one layer (refer to FIG. 6).

Figure 5:
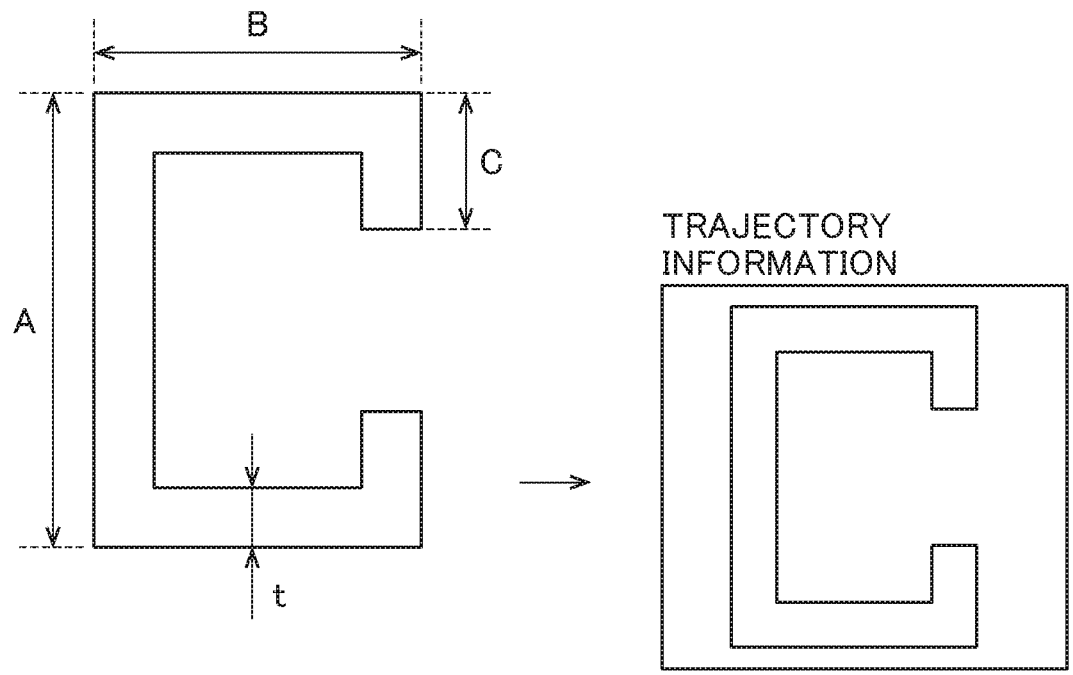
FIG. 5 is a view showing an example of trajectory information of any 3D shape consisting of at least one layer.

It should be noted that, although only showing the trajectory information of a first layer in FIGS. 4 to 6, there is actually a plurality of layers, and each layer may be a trajectory of a different shape. In addition, it may be configured by only one layer (two dimensional).

Next, as shown in FIG. 8, line segments constituting the trajectory information of any 3D shape consisting of at least one layer is edited. For example, the addition of line segments, deletion, change in shape, etc. are performed.

Herein, for example, by the addition of line segments of any 3D shape consisting of at least one layer, deletion, change in shape, etc., the trajectory of any 3D shape consisting of at least one layer read from the text file or CAD data is manually drawn and changed. Alternatively, the trajectory of any 3D shape consisting of at least one layer of a movement pattern already stored is manually drawn and changed.

Figure 9:
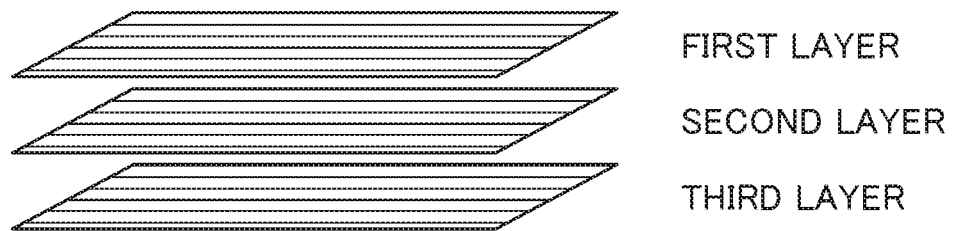
FIG. 9 is a view showing an example of designating the depth in the Z-direction of trajectory information of any 3D shape consisting of at least one layer.
Figure 10:
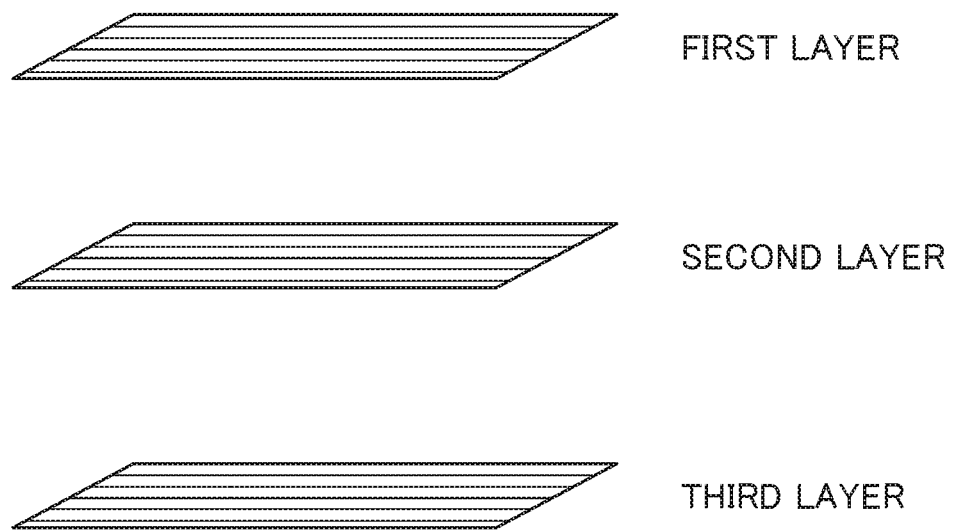
FIG. 10 is a view showing an example of designating the depth in the Z-direction of trajectory information of any 3D shape consisting of at least one layer.

Next, as shown in FIGS. 9 and 10, the depth in the Z direction of the trajectory information of any 3D shape consisting of at least one layer is designated.

For example, the depth in the Z direction of a default defined in the information of the trajectory of any 3D shape consisting of at least one layer read from a text file or CAD data is changed. Alternatively, the depth in the Z direction of trajectory information of any 3D shape consisting of at least one layer of a movement pattern which is already stored is changed. It should be noted that it is also possible to set so as to move many times on the same surface, by setting the depth of each layer to 0.

Figure 11:
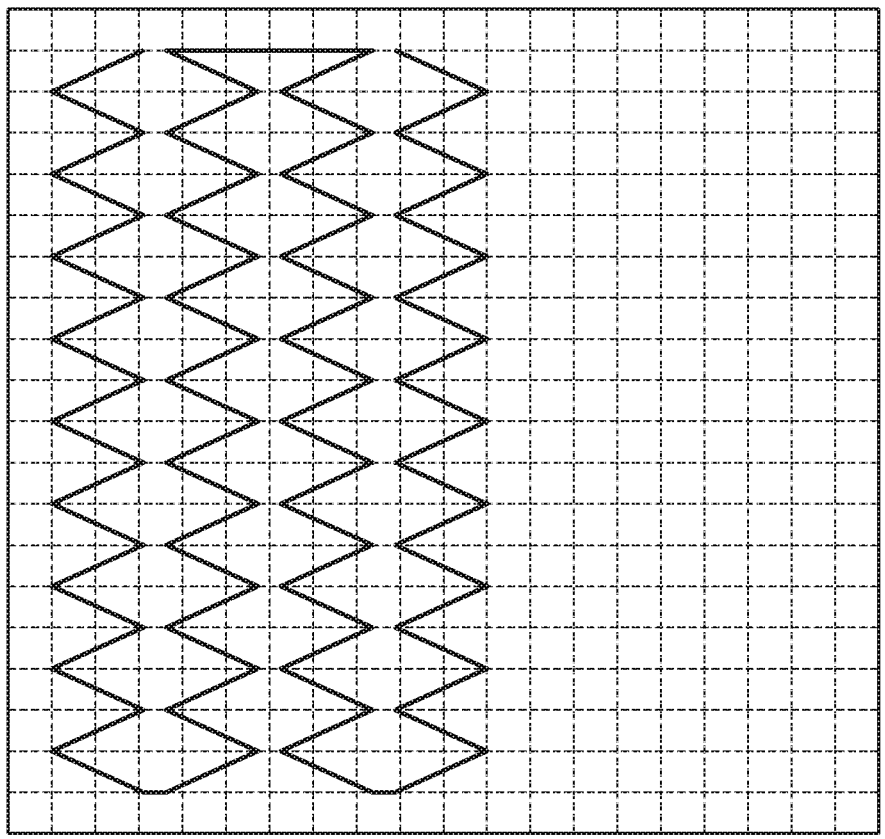
FIG. 11 is a view showing an example of designating the scales in the X-direction and Y-direction of trajectory information of any 3D shape consisting of at least one layer.
Figure 12:
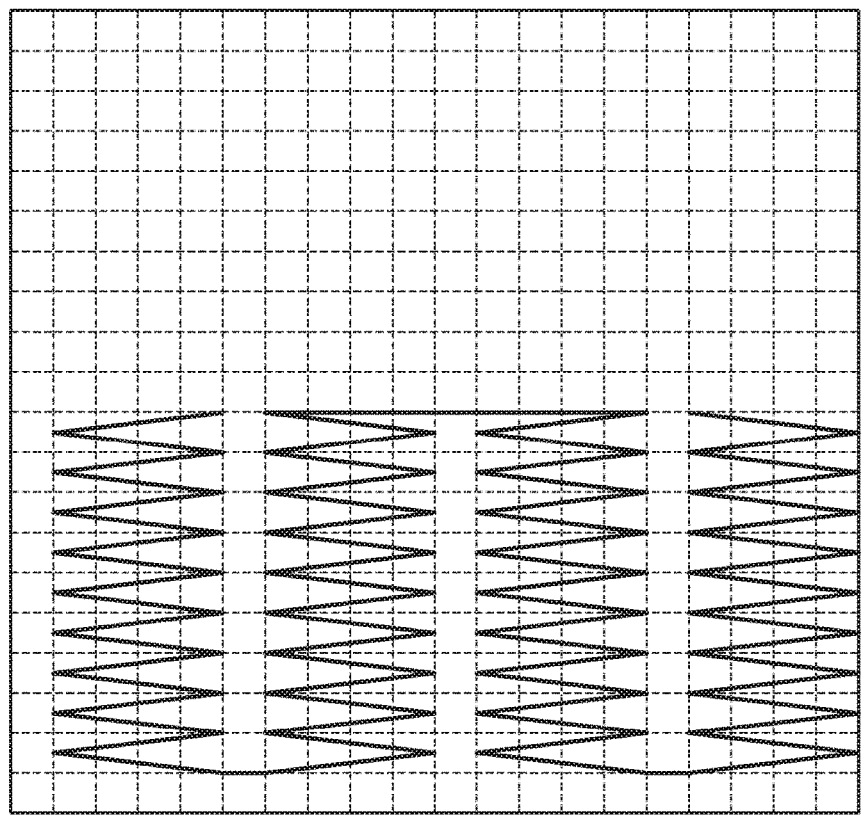
FIG. 12 is a view showing an example of designating the scales in the X-direction and Y-direction of trajectory information of any 3D shape consisting of at least one layer.

Next, as shown in FIGS. 11 and 12, the scales in the X direction and Y direction of the trajectory information of any 3D shape consisting of at least one layer are designated.

For example, the scales in the X direction and Y direction of the trajectory information of any 3D shape consisting of at least one layer read from a text file or CAD data are changed. Alternatively, the scales in the X direction and Y direction of the trajectory information of any 3D shape consisting of at least one layer of the movement pattern which is already stored are changed.

Figure 13:
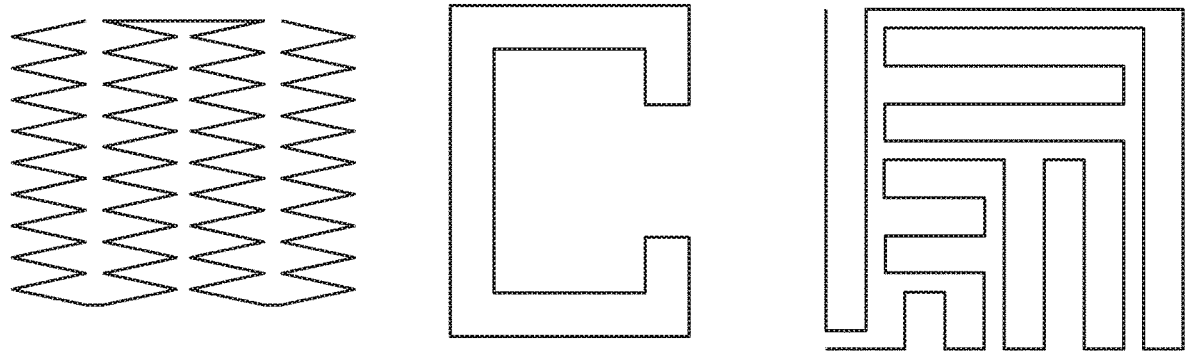
FIG. 13 is a view showing examples of a plurality of types of movement patterns consisting of the trajectory of any 3D shape consisting of at least one layer.

Next, as shown in FIG. 13, for example, the movement pattern consisting of the trajectory of any 3D shape consisting of at least one layer is created from the trajectory information of any 3D shape consisting of at least one layer. In addition, a plurality of types of movement patterns consisting of the trajectory of any 3D shape consisting of at least one layer is stored.

FIG. 13 shows only the movement pattern of a first layer. There is actually a plurality of layers, and each layer may be a trajectory of a different shape. In addition, it may be configured by only one layer (two dimensional).

First, it may be configured so as to fill a curved surface or a plurality of continuous planes of the three-dimensional shape described layer with the first layer of the movement pattern, and the first layer is projected onto at least one surface of the work model. In this case, the second and later layers of the movement pattern come to cut more into the surface of the work model, and the action of carving by the tool becomes possible.

Next, the three-dimensional shape containing a curved surface, or the three-dimensional shape containing a plurality of continuous planes is filled with the movement pattern consisting of the trajectory of any shape consisting of at least one layer, and the three-dimensional shape is arranged in virtual space so that the movement pattern is projected onto at least one surface of the work model.

In addition, the machining path of the tool is created by projecting the movement pattern onto at least one surface of the work model, and the position or position and posture of the tool model is automatically determined based on the created machining path and the normal direction of at least one surface of the work model.

Example 1

Herein, an explanation will be provided giving a more specific first example.

Figure 14:
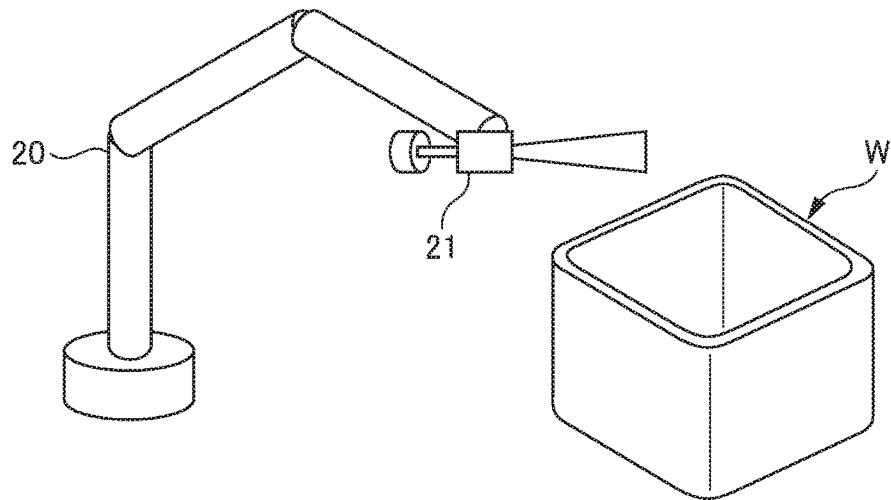
FIG. 14 is a view showing an example of a robot system according to the embodiment.

A robot system 1 of <Example 1: first example> is one example which performs machining on a workpiece W by a robot 20 to which a blast device (tool 21) is mounted at a leading end, as shown in FIG. 14, for example, and arranges a work model, robot model and tool model within virtual space representing the work space three dimensionally.

Figure 15:
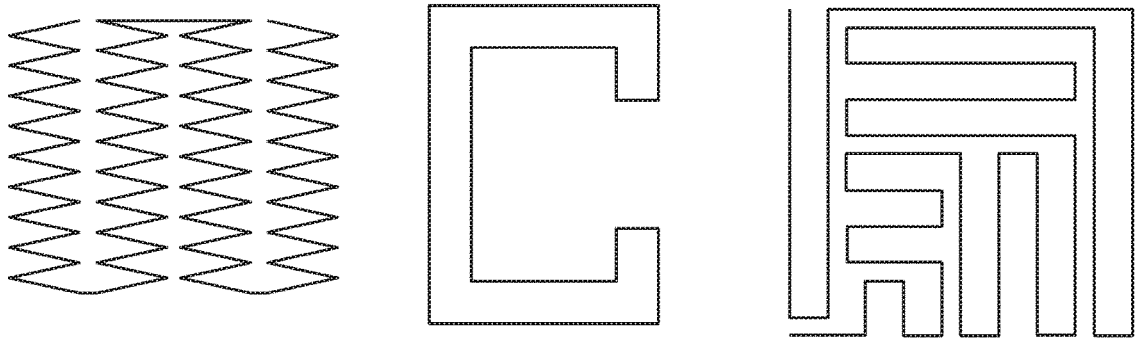
FIG. 15 is a view showing an example of a plurality of types of movement patterns consisting of the trajectory of any 3D shape consisting of at least one layer.
Figure 16:
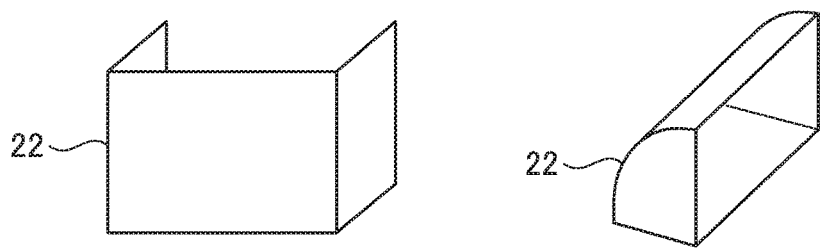
FIG. 16 is a view showing an example of a three-dimensional shape including a curved surface, or a three-dimensional shape including a plurality of continuous planes.

With the robot system 1 of the present embodiment, one movement pattern is selected from a plurality of types of movement patterns as shown in FIG. 15, and a three-dimensional shape and a three-dimensional shape (22) including a plurality of continuous planes are stored as shown in FIG. 16.

Then, a three-dimensional shape including a curved surface or a three-dimensional shape including a plurality of continuous planes is selected from the three-dimensional storage unit 11.

Figure 17:
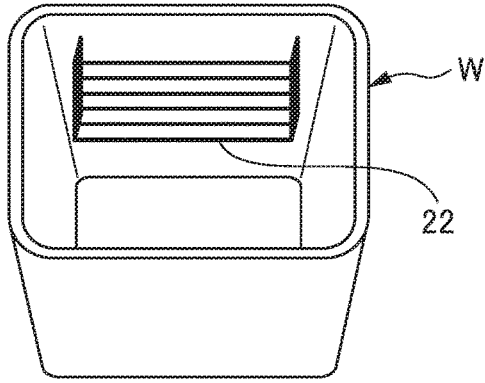
FIG. 17 is a view showing a state of filling a curved surface or plurality of continuous planes of the three-dimensional shape by the selected one movement pattern, and arranging the three-dimensional shape in a virtual space so that the movement pattern is projected onto at least one surface of the work model.

Next, as shown in FIG. 17 (FIG. 20), the curved surface or plurality of continuous planes of the three-dimensional shape selected is filled with the selected one movement pattern, and the three-dimensional shape is arranged in the virtual space so that the movement pattern is provided onto at least one surface of the work model.

Figure 18:
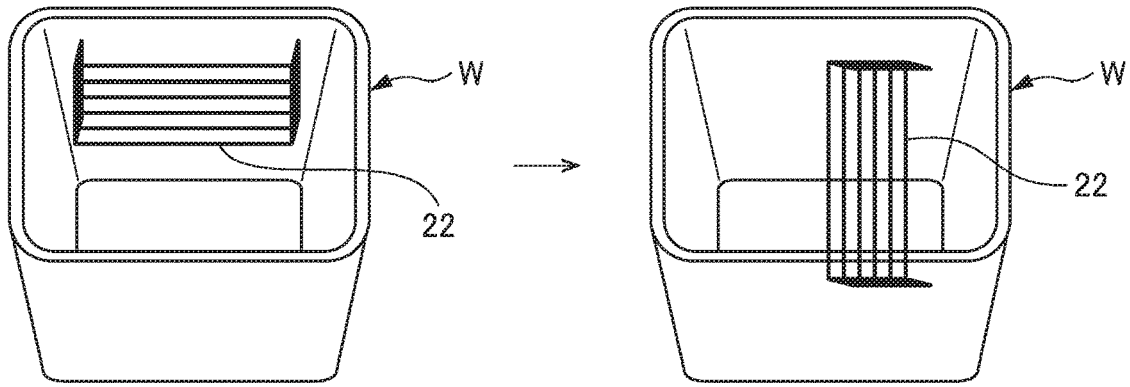
FIG. 18 is a view showing a state of setting a positional posture relative to a surface of the work model of the three-dimensional shape.

As shown in FIG. 18 (FIG. 21), the position and posture of the three-dimensional shape relative to the surface of the work model is set.

Figure 19:
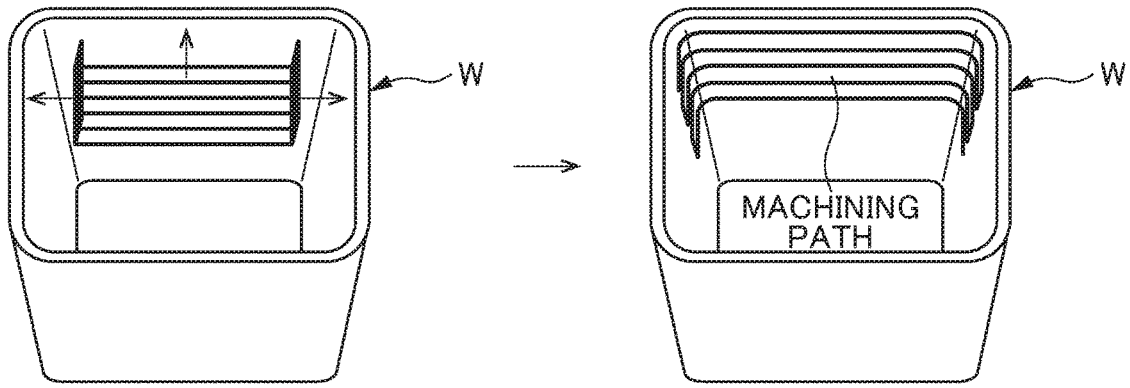
FIG. 19 is a view showing a state of creating a machining path of the tool.
Figure 20:
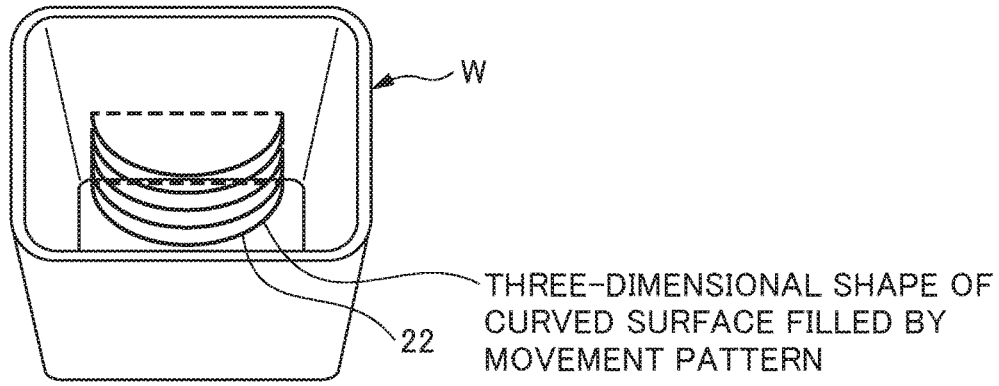
FIG. 20 is a view showing a state of filling a curved surface or plurality of continuous planes of the selected three-dimensional shape by the selected one movement pattern, and arranging the three-dimensional shape in the virtual space so that the movement pattern is projected onto at least one surface of the work model.
Figure 21:
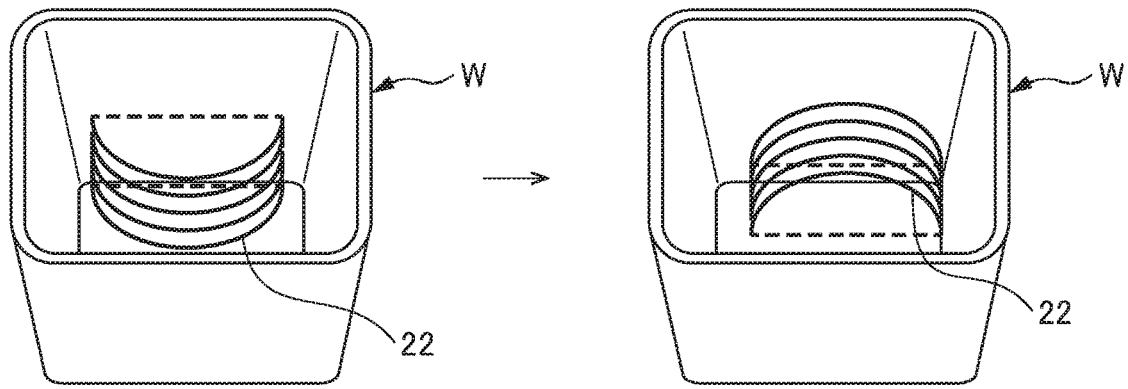
FIG. 21 is a view showing a state of setting the position and posture of the three-dimensional shape relative to a surface of the work model.
Figure 22:
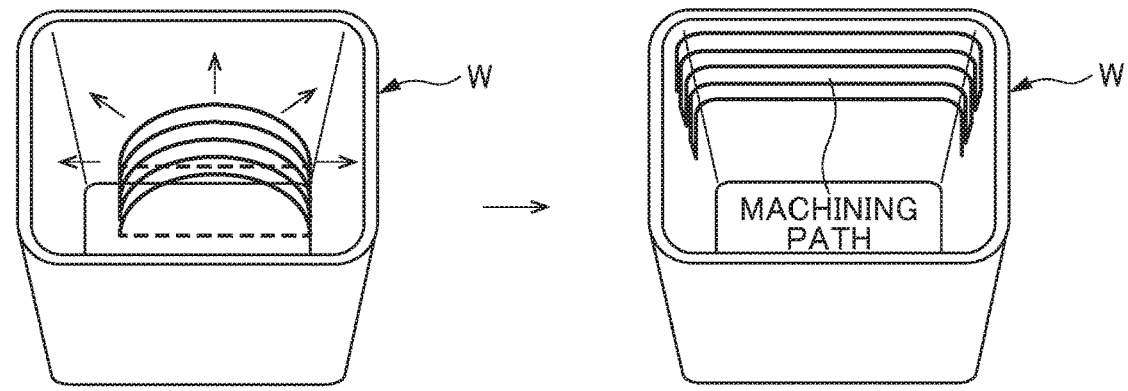
FIG. 22 is a view showing a state of creating a machining path of tools.
Figure 27:
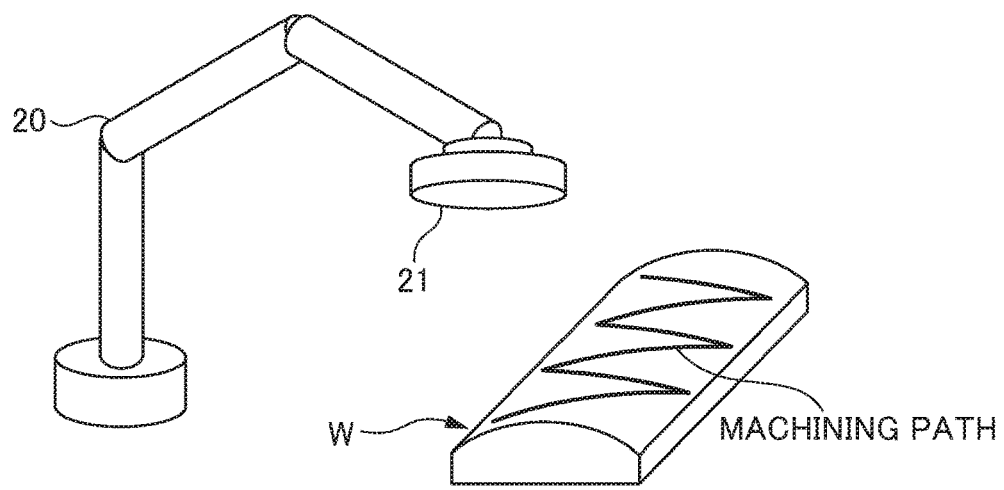
FIG. 27 is a view showing an example of a robot system.
Figure 28:
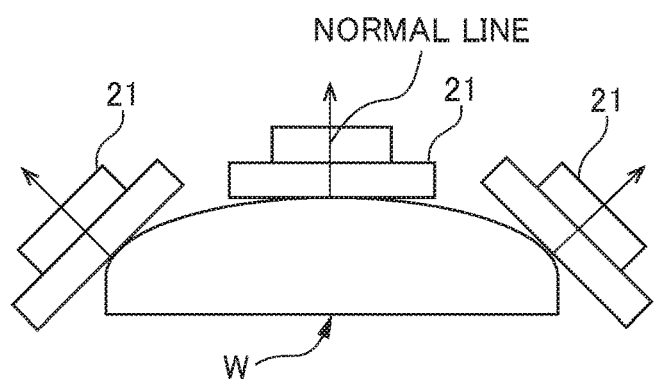
FIG. 28 is a view showing an aspect of automatically determining the position or position and posture of a tool model, based on a created machining path and the normal direction of at least one surface of a work model.

As shown in FIG. 19 (FIG. 22), the machining path of the tool is created by projecting the movement pattern filling the curved surface or plurality of continuous planes of the three-dimensional shape onto at least one surface of the work model, and the position or position and posture of the tool model is automatically determined based on the created machining path and the normal direction of at least one surface of the work model (refer to FIGS. 27 and 28).

Example 2

Next, an explanation will be provided giving a more specific second example.

Figure 23:
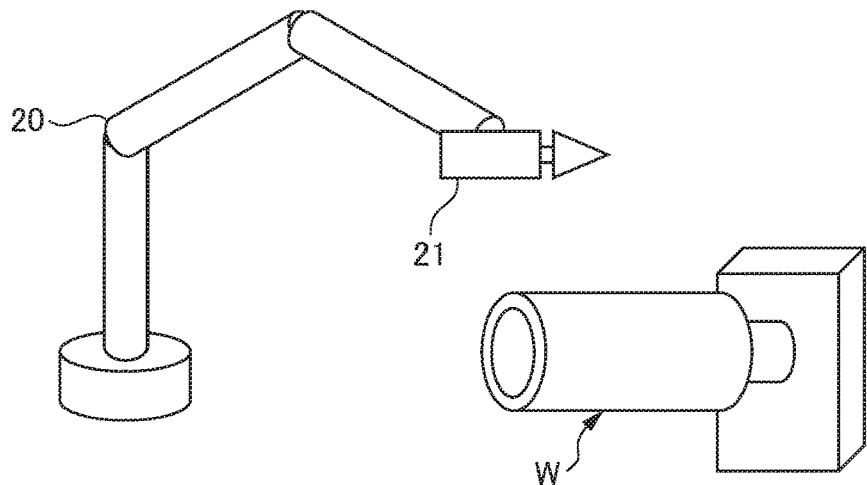
FIG. 23 is a view showing an example of a robot system according to an embodiment.

A robot system 1 of <Example 2: second example> is one example which performs machining on a workpiece W by a robot 20 to which a grinding device (tool 21) is mounted at a leading end, as shown in FIG. 23, for example, and similarly to the aforementioned (Example 1: first example>, arranges a work model, robot model and tool model within virtual space representing the work space three dimensionally, selects one movement pattern from a plurality of types of movement patterns, as well as storing the three-dimensional shape and three-dimensional shape (22) including a plurality of continuous planes. In addition, the three-dimensional shape including a curved surface or the three-dimensional shape including a plurality of continuous planes is selected from the three-dimensional shape storage unit 11 (refer to FIGS. 15 and 16).

Figure 24:
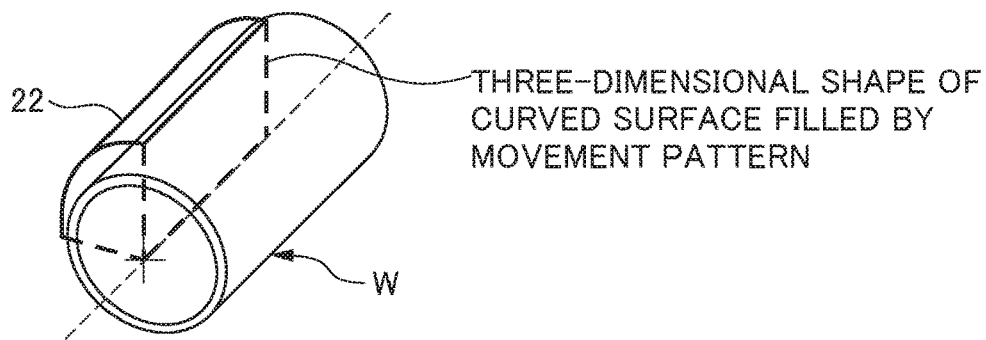
FIG. 24 is a view showing a state of filling a curved surface or plurality of continuous planes of the selected three-dimensional shape by the selected one movement pattern, and arranging the three-dimensional shape in the virtual space so that the movement pattern is projected onto at least one surface of the work model.

Next, as shown in FIG. 24, the curved surface or plurality of continuous planes of the selected three-dimensional shape is filled with the selected one movement pattern, and the three-dimensional shape is arranged in the virtual space so that the movement pattern is projected onto at least one surface of the work model.

Figure 25:
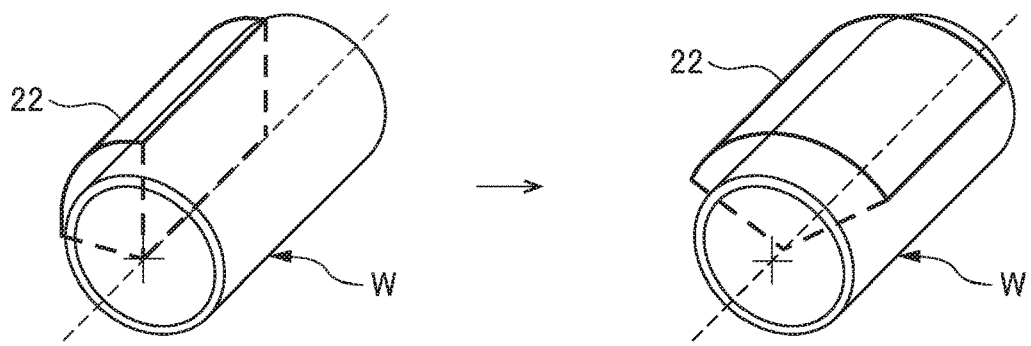
FIG. 25 is a view showing a state of setting the position and posture of the three-dimensional shape relative to a surface of the work model.
Figure 26:
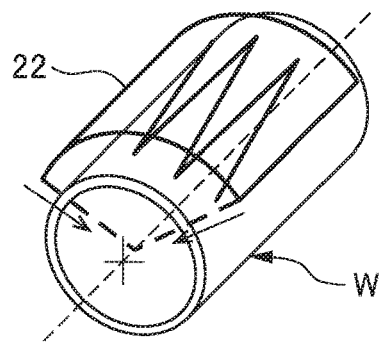
FIG. 26 is a view showing a state of creating a machining path of the tool.

Next, as shown in FIGS. 25 and 26, the position and posture of the three-dimensional shape relative to the surface of the work model is set, and the machining path of the tool is created by projecting the movement pattern filling the curved surface or plurality of continuous planes of the three-dimensional surface onto at least one surface of the work model.

Then, the position or position and posture of the tool model is automatically determined based on the created machining path and the normal direction of at least one surface of the work model (refer to FIGS. 27 and 28).

Herein, FIG. 27 is an example of performing machining on the workpiece W with the robot 20 to which a grindstone (tool) 21 is mounted at a leading end, and FIG. 28 shows a concept of automatically determining the position or position and posture of the tool model, based on the created machining path and the normal direction of at least one surface of the work model.

Therefore, according to the robot system 1 of the present embodiment, it is possible to create a machining path consisting of the trajectory of any shape, and possible to reduce the workload required in teaching of the machining path of any shape. It thereby becomes possible to eliminate the conventional inconvenience of requiring great effort and time in the creation of a machining path consisting of the trajectory of any shape.

Although an embodiment of a robot system has been explained above, the present invention is not to be limited to the above-mentioned embodiment, and modifications are possible where appropriate within a scope not departing from the gist thereof.

EXPLANATION OF REFERENCE NUMERALS 1 robot system
2 off-line programming device
3 trajectory information creation unit
4 trajectory information editing unit
5 trajectory information scale designation unit
6 trajectory information depth designation unit
7 movement pattern creation unit
8 movement pattern storage unit
9 virtual space creation unit
10 model arrangement unit
11 three-dimensional shape storage unit
12 movement pattern selection unit
13 three-dimensional shape selection unit
14 three-dimensional shape arrangement unit
15 machining path creation unit
16 tool position-posture determination unit
20 robot
21 tool
W workpiece

What is claimed is:

1. A robot system comprising an off-line programming device which teaches a program of a robot equipped with a tool that machines a workpiece disposed within a work space,
wherein the off-line programming device includes:
a trajectory information creation unit which creates trajectory information of any three-dimensional shape consisting of at least one layer; and
a trajectory information editing unit which edits the trajectory information of any three-dimensional shape consisting of at least one layer.

2. The robot system according to claim 1, wherein the off-line programming device further includes:
a trajectory information scale designation unit which designates scales of an X direction and a Y direction of the trajectory information of any three-dimensional shape consisting of at least one layer;
a trajectory information depth designation unit which designates a depth in a Z direction of the trajectory information of any three-dimensional shape consisting of at least one layer;
a movement pattern creation unit which creates a movement pattern consisting of the trajectory of any three-dimensional shape consisting of at least one layer, from the trajectory information of any three-dimensional shape consisting of at least one layer; and
a movement pattern storage unit which stores a plurality of types of movement patterns consisting of the trajectory of any three-dimensional shape consisting of at least one layer.

3. The robot system according to claim 2, wherein the off-line programming device further includes:
a virtual space creation unit which creates a virtual space expressing the work space three-dimensionally;
a model arrangement unit which arranges a work model of the workpiece, a robot model of the robot and a tool model of the tool within the virtual space created by the virtual space creation unit;
a three-dimensional shape storage unit which stores a three-dimensional shape including a curved surface and a three-dimensional shape including a plurality of continuous planes;
a movement pattern selection unit which selects one movement pattern from among the plurality of movement patterns stored in the movement pattern storage unit;
a three-dimensional shape selection unit which selects the three-dimensional shape including a curved surface or the three-dimensional shape including a plurality of continuous planes from the three-dimensional shape storage unit;
a three-dimensional shape arrangement unit which fills the curved surface or the plurality of continuous planes of the three-dimensional shape selected by the three-dimensional shape selection unit with one movement pattern selected by the movement pattern selection unit, and arranges the three-dimensional shape in the virtual space so that the movement pattern is projected onto at least one surface of the work model;
a machining path creation unit which creates a machining path of the tool by projecting the movement pattern filling the curved surface or the plurality of continuous planes of the three-dimensional shape onto the at least one surface of the work model; and
a tool position posture determination unit which automatically determines a position or position and posture of the tool model, based on the machining path created by the machining path creation unit and a normal direction of the at least one surface of the work model.

4. The robot system according to claim 1, wherein the off-line programming device further includes:
a virtual space creation unit which creates a virtual space expressing the work space three-dimensionally;

a model arrangement unit which arranges a work model of the workpiece, a robot model of the robot and a tool model of the tool within the virtual space created by the virtual space creation unit;

a three-dimensional shape storage unit which stores a three-dimensional shape including a curved surface and a three-dimensional shape including a plurality of continuous planes;

a movement pattern selection unit which selects one movement pattern from among the plurality of movement patterns stored in the movement pattern storage unit;

a three-dimensional shape selection unit which selects the three-dimensional shape including a curved surface or the three-dimensional shape including a plurality of continuous planes from the three-dimensional shape storage unit;

a three-dimensional shape arrangement unit which fills the curved surface or the plurality of continuous planes of the three-dimensional shape selected by the three-dimensional shape selection unit with one movement pattern selected by the movement pattern selection unit, and arranges the three-dimensional shape in the virtual space so that the movement pattern is projected onto at least one surface of the work model;

a machining path creation unit which creates a machining path of the tool by projecting the movement pattern filling the curved surface or the plurality of continuous planes of the three-dimensional shape onto the at least one surface of the work model; and a tool position posture determination unit which automatically determines a position or position and posture of the tool model, based on the machining path created by the machining path creation unit and a normal direction of the at least one surface of the work model.

* * * * *